June 22, 1937.    R. R. CEASE    2,084,891
RAILWAY TRUCK
Filed May 14, 1934    2 Sheets-Sheet 1
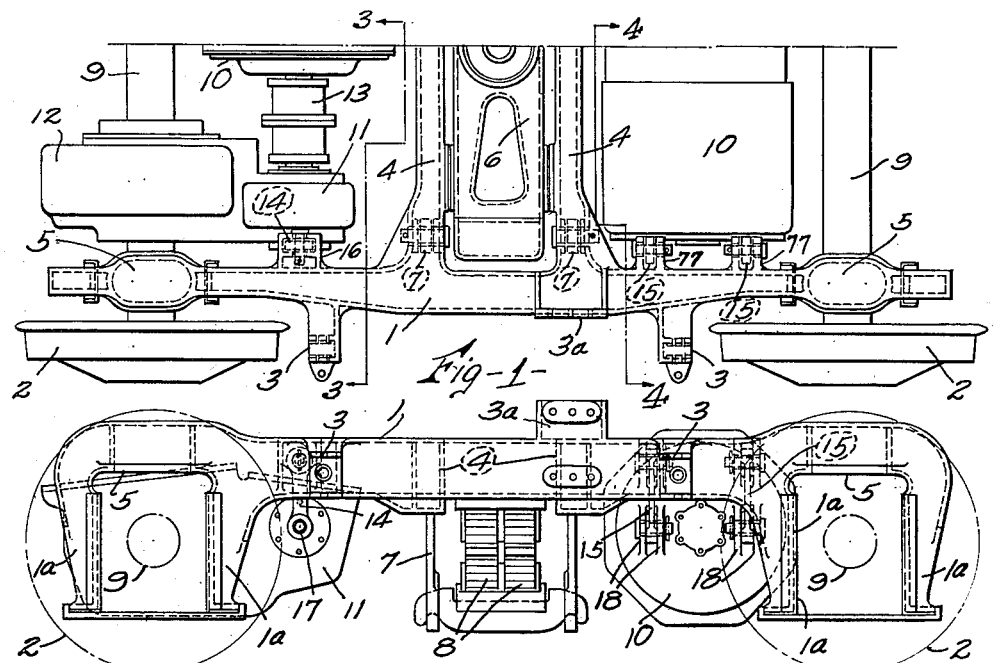
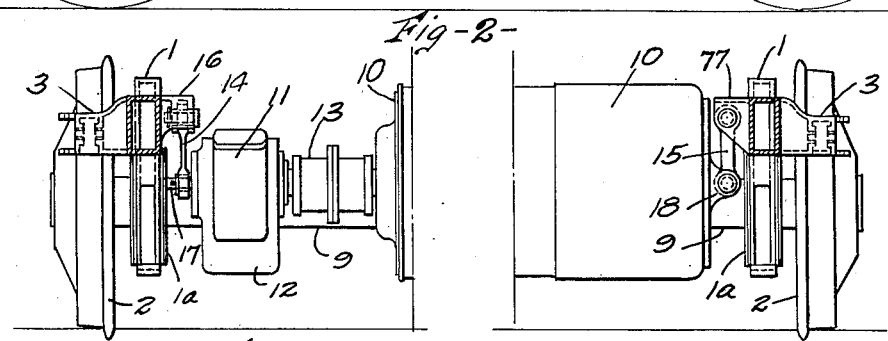
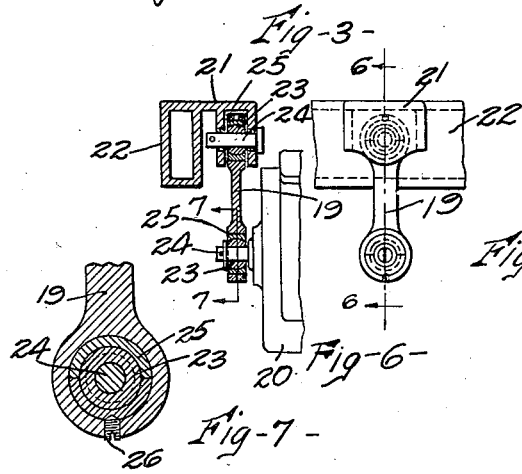
Inventor
Robert R. Cease
By
Rodney Bedell
Attorney

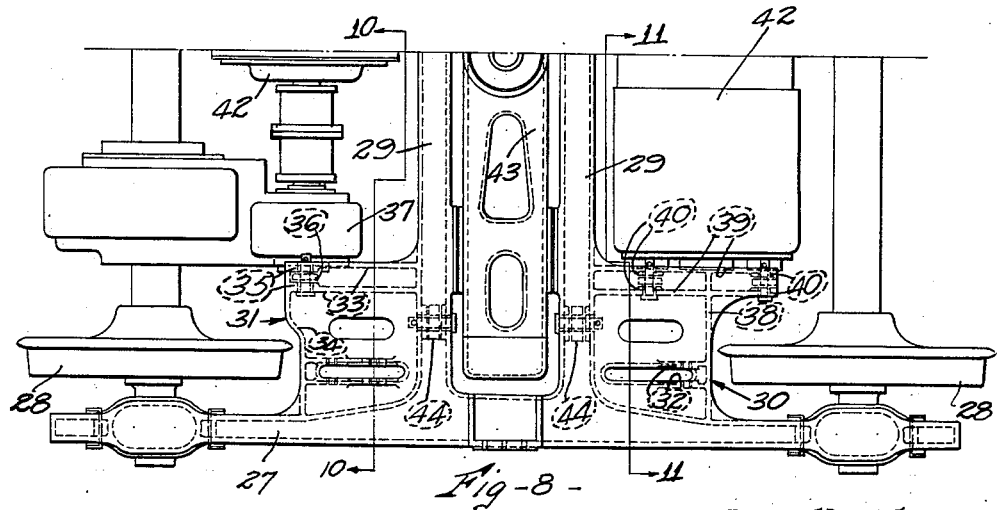
Fig-8-
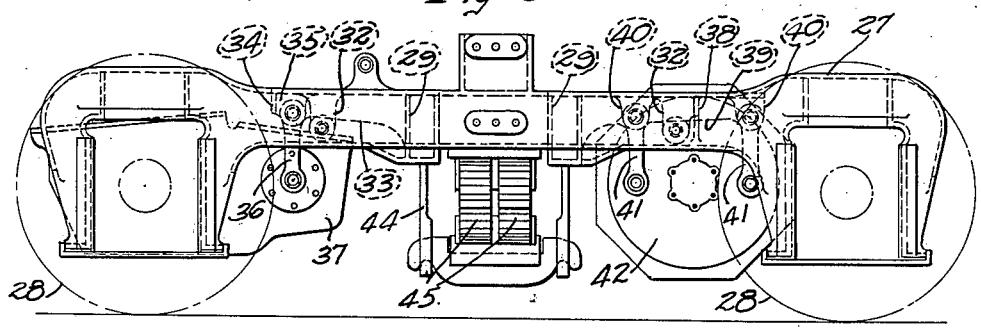
Fig-9-
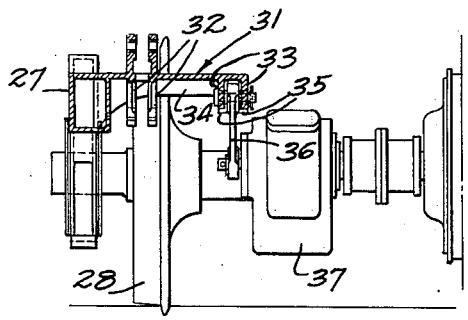
Fig-10-
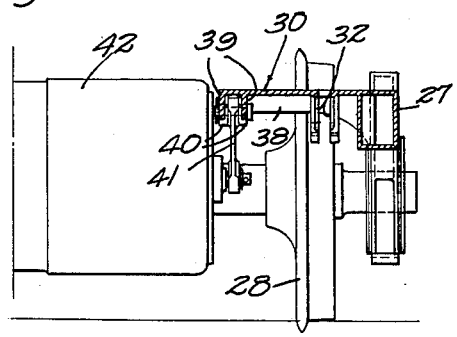
Fig-11-
Inventor
Robert R. Cease.
By Rodney Bedell
Attorney Patented June 22, 1937

2,084,891

UNITED STATES PATENT OFFICE 2,084,891

RAILWAY TRUCK

Robert R. Cease, Nameoki, Ill., assignor to General Steel Castings Corporation, Granite City, Ill., a corporation of Delaware Application May 14, 1934, Serial No. 725,629

12 Claims. (Cl. 105—136)

This invention relates to railway motor trucks and consists particularly in novel means for mounting truck propelling mechanism upon the truck frame.

Heretofore the motors in railway motor trucks have been carried by the transoms and connected to the truck axles by means of pinions on the motor armatures meshing with gears on the axles. The motors operate at relatively low speeds and are heavy and bulky, necessitating substantial enlargement of the transoms to provide adequate support therefor. The motors are connected to the transoms by means of various more or less complicated flexible connections to permit limited movement of the motors in vertical planes.

An object of the present invention is to provide a motor truck of substantially less weight than previous trucks by equipping the same with relatively light, high-speed motors connected to the truck axles by suitable reduction gearing.

Another object is to provide simplified and novel means for mounting the motors upon the truck wheel pieces instead of upon the transoms as has been the case heretofore.

Another object is to provide novel means for flexibly supporting the motors from the truck frame.

These objects and others are attained substantially by the structures illustrated in the accompanying drawings in which—

Figure 1 is a half top view of a railway motor truck illustrating the invention.

Figure 2 is a side view of the same.

Figures 3 and 4 are half vertical transverse sections taken on the corresponding section lines of Figure 1.

Figure 5 is a fragmentary side view showing a modified detail.

Figure 6 is a vertical transverse section taken on the line 6—6 of Figure 5 and showing the gear housing in elevation.

Figure 7 is a detail vertical section taken longitudinally of the truck on the line 7—7 of Figure 6.

Figure 8 is a half top view of a modified form of truck.

Figure 9 is a side view of the same.

Figures 10 and 11 are vertical transverse sections taken on the corresponding section lines of Figure 8.

Figures 1 to 4 illustrate the truck frame which may be conveniently formed, as shown, of an integral casting including wheel piece 1 inside the truck wheels 2 and having brake hanger brackets 3 projecting outwardly therefrom and a bracket 3a for auxiliary equipment, and transoms 4. The wheel piece is supported upon the usual journal boxes, mounted within pedestals 1a, by means of springs engaging the spring seats 5, the springs and journal boxes being omitted. Between the transoms is a swinging bolster 6 supported from the transoms by hangers 7 and elliptic springs 8. The truck is symmetrical about the longitudinal center line, and only the half illustrated in Figures 1, 3, and 4 will be described.

Between each transom and the adjacent truck axle 9 is a motor housing 10 enclosing a high speed motor connected to the axle by means of suitable reduction gearing within the gear housing 11, 12. The motor housing 10 and the gear housing 11 are spaced substantially apart transversely of the truck and a rigid coupling 13 between the two housings connects alined shaft members which extend substantially across the truck. The reduction gear housing is carried by the axle and, through a hanger 14, by the adjacent wheel piece. A pair of hangers 15 support the motor housing from the other wheel piece. Suitable bearings (not shown) in the housings 10 and 11 journal the motor shaft and the alined reduction gearing shaft.

The single hanger 14 is pivoted to the bracket 16, projecting inwardly from the wheel piece, and to a suitable trunnion 17 in the side of the gear housing alined with the motor axis. Hanger 14 swings longitudinally of the truck and permits gear casing 11, 12 to rotate about the coupled shaft to accommodate relative vertical movement of the axle and motor shaft due to the functioning of the frame supporting springs. The shaft coupling 13 may be made resilient, as by inserting a rubber cushion between the two halves of the coupling, without affecting the proper support of the motor.

The two hangers 15 are pivoted to brackets 17, projecting inwardly from the wheel piece, and to the brackets 18 on the motor housing. The hangers 15 swing transversely of the truck in order to accommodate tilting of the motor shaft in a vertical plane. The double hangers also prevent rotation of the motor housing about the axis of the motor axle. The reduction gear casing can rotate about the motor axle axis.

In Figures 5 to 7 is illustrated a hanger 19 corresponding to one of the hangers 14 in the previous form and supporting the gear housing 20 from the bracket 21 on wheel piece 22. The hanger is connected to bracket 21 and the gear housing by means of universal joint connections, each including a spherical collar 23 enclosing the pin 24 and seated in the spherically hollowed split ring 25 which is secured in the end of the hanger 19 by means of a set screw 26. The universal joints at each end of the hanger are identical. This type of hanger support obviously permits greater flexibility of the motor and gearing structure and may be advantageously used in place of the double hangers 15 as well as the single hangers 14 shown in the previous form.

In Figures 8 to 11, the truck frame includes wheel piece 27, outside the truck wheels 28, and transoms 29, the intersections between the transoms and wheel piece being reinforced by gussets generally indicated at 30 and 31. These gussets include brackets 32 for the brake hangers, not shown. Each gusset 31 is reinforced by ribs 33 and 34, the former terminating at one end in the brackets 35 for the single hanger 36 supporting the gear housing 37. Each gusset 30 is reinforced by ribs 38 and 39, the latter forming the brackets 40 to which are pivoted the hangers 41 supporting the motor housing 42. The bolster 43 is carried as in the previous form from the transoms 29 by means of hangers 44 and elliptic springs 45. This form of truck is slightly heavier than that illustrated in Figures 1 to 4 but still is substantially lighter than the old style of trucks in which the motors are carried from heavy transoms.

In each of the forms described, the transoms may be made substantially lighter than has been possible in previous motor trucks in which the motors are secured directly to the transoms, and although the motor stresses are applied directly to the wheel pieces, these parts are ordinarily sufficiently heavy for this purpose, particularly in the nonequalizer type trucks as illustrated, and do not need to be substantially increased in size or reinforced. The novel truck is therefore substantially lighter and more economical than previous motor trucks due to the lighter transoms and high speed motors used while at the same time comparing favorably in ruggedness and durability with the previous trucks. Moreover, the novel truck and particularly the motor supporting means is substantially simpler and more flexible than in previous motor trucks. The truck may be equipped with motors running at approximately twice the speed of the motors formerly used and these high speed motors have the further advantage of providing greater acceleration. This acceleration may be additionally increased by reducing the size of the truck wheels. The motor may be easily detached from the truck frame to facilitate inspection and repair.

Various features of the structures illustrated and particularly the details of the truck itself may be modified as will occur to those skilled in the art without departing from the spirit of the invention and the exclusive use of all such modifications coming within the scope of the appended claims is contemplated.

I claim:

1. In a railway truck, framing including side frames, and a single pivot on one of said side frames and a plurality of pivots on the other side frame opposite said single pivot, said pivots cooperating in forming a three point support for a single unit of truck propelling mechanism.

2. In a railway motor truck, side frames, propelling mechanism including a motor and its truck axle connection, and swing hangers directly securing said mechanism to said side frames and constituting the sole supports for said mechanism.

3. Structure as specified in claim 2 in which said hangers are swingable in non-parallel planes.

4. In a railway motor truck, wheel pieces, a motor member, a gear housing member associated with said motor member, a coupling between said members, a single hanger supporting one of said members from one of said wheel pieces, and a plurality of hangers supporting the other member from the other wheel piece.

5. In a railway motor truck, wheel pieces, a motor, a gear housing associated with said motor, a coupling between said motor and said housing, hanger structure supporting said motor from one of said wheel pieces and swingable transversely of the truck, and hanger structure supporting said housing from the other wheel piece and swingable longitudinally of the truck.

6. Structure as specified in claim 5 in which the truck is provided with a plurality of coupled motors and gear housings, the motors being supported from diagonally opposite portions of the framing.

7. In a railway motor truck, wheel pieces, truck propelling mechanism between the same and associated with a truck axle, hanger structure supporting a part of said mechanism from one of said wheel pieces and swingable transversely of the truck, and hanger structure supporting another part of said mechanism from the other wheel piece and swingable longitudinally of the truck, said last-mentioned hanger structure having universal joint connection with the associated wheel piece and part of the propelling mechanism whereby said mechanism may freely tilt to accommodate vertical movement of the truck axle driven thereby and is prevented from rotating.

8. In a railway motor truck, wheel pieces and truck propelling structure extending between the same and including a motor frame pivotally supported at least in part from one of said wheel pieces and a gear housing substantially spaced from said motor transversely of the truck, the connection between said motor frame and said wheel pieces permitting tilting of said structure transversely of the truck but preventing rotation thereof about an axis extending transversely of the truck.

9. In a railway truck, spaced side frames, rigid structure extending between said frames and including a motor, reduction gearing therefor, and a coupling between said motor and gearing, and means providing a three-point support for said structure on said side frames.

10. In a railway truck, spaced side frames, rigid structure extending between said frames and including a motor and housing therefor, a reduction gearing and housing therefor, and a coupling between said housings, and means providing a three-point support for said structure on said wheel pieces, one of said points of support including a pivotal connection for said gear housing alined with the axis of the motor to accommodate rotation of the reduction gearing about said axis.

11. In a railway truck, spaced side frames, rigid structure extending between said frames and including a motor and housing therefor, a reduction gearing and housing therefor, and a coupling between said housings, and means providing a three-point support for said structure on said wheel pieces, one of said points of support including a pivotal connection for said reduction gearing housing alined with the axis of the motor to accommodate rotation of the reduction gearing about said axis, and the other two points of support including connections to said motor housing spaced from said axis to prevent oscillation of the motor frame about said axis.

12. In a railway motor truck, side frames, and a truck propelling motor carried substantially exclusively by three-point support directly on said side frames.

ROBERT R. CEASE.